United States Patent
Maleki et al.

[11] Patent Number: 6,167,354
[45] Date of Patent: Dec. 26, 2000

[54] METHOD AND APPARATUS FOR MONITORING BRAKE OPERATION IN AN ANTI-LOCK OR ELECTRONIC BRAKING SYSTEM

[75] Inventors: Ali F. Maleki, Oxford, Mich.; Naman A. Elamin, Avon Lake, Ohio; Gerry McCann, Lafayette, Ind.

[73] Assignee: AlliedSignal Truck Brake Systems Company, Elyria, Ohio

[21] Appl. No.: 09/174,707

[22] Filed: Oct. 19, 1998

[51] Int. Cl.[7] ................................ G01P 3/00; B60T 8/00
[52] U.S. Cl. ..................... 702/147; 702/145; 702/148; 701/70; 701/78; 701/79
[58] Field of Search ........................... 702/142, 145, 702/147, 148; 701/41, 70, 71–72, 78, 79; 303/9.62, 113.5, 113.2

[56] References Cited

U.S. PATENT DOCUMENTS

| | | | |
|---|---|---|---|
| 4,656,588 | 4/1987 | Kubo | 303/122.11 |
| 5,220,506 | 6/1993 | Kuwana et al. | 701/79 |
| 5,436,836 | 7/1995 | Holtz et al. | 701/78 |
| 5,479,811 | 1/1996 | Baumann et al. | |
| 5,540,488 | 7/1996 | Terazawa et al. | 303/113.2 |
| 5,650,718 | 7/1997 | Stuible et al. | |
| 5,682,333 | 10/1997 | Baumann | 701/148 |
| 5,691,900 | 11/1997 | Luckevich | 701/41 |
| 5,935,186 | 8/1999 | Yamazaki et al. | 701/78 |

FOREIGN PATENT DOCUMENTS

| | | |
|---|---|---|
| 0 387 384 | 9/1990 | European Pat. Off. . |
| 0 738 638 | 10/1996 | European Pat. Off. . |
| 44 18 070 | 10/1995 | Germany . |
| 196 47 436 | 5/1997 | Germany . |
| 196 28 217 | 1/1998 | Germany . |
| 2 202 016 | 9/1988 | United Kingdom . |

*Primary Examiner*—Patrick Assouad
*Assistant Examiner*—Bryan Bui

[57] ABSTRACT

A method and apparatus for monitoring the operation of vehicle brakes on a vehicle equipped with an electronic braking system as is commonly used to provide traction control (TC) and/or an anti-lock braking system (ABS). The speed at which a first wheel located on a first side of a vehicle rotates in relation to the speed at which a second wheel located on a second side of the vehicle rotates during particular braking events is examined. For each wheel, any difference or "error" in the rotation speed during the select braking events relative to the other side wheel is accumulated or integrated over a select duration until a threshold difference value is reached which indicates a malfunction at the subject wheel end. The accumulated difference is periodically adjusted to account for normal or acceptable levels of wheel speed variation.

15 Claims, 8 Drawing Sheets

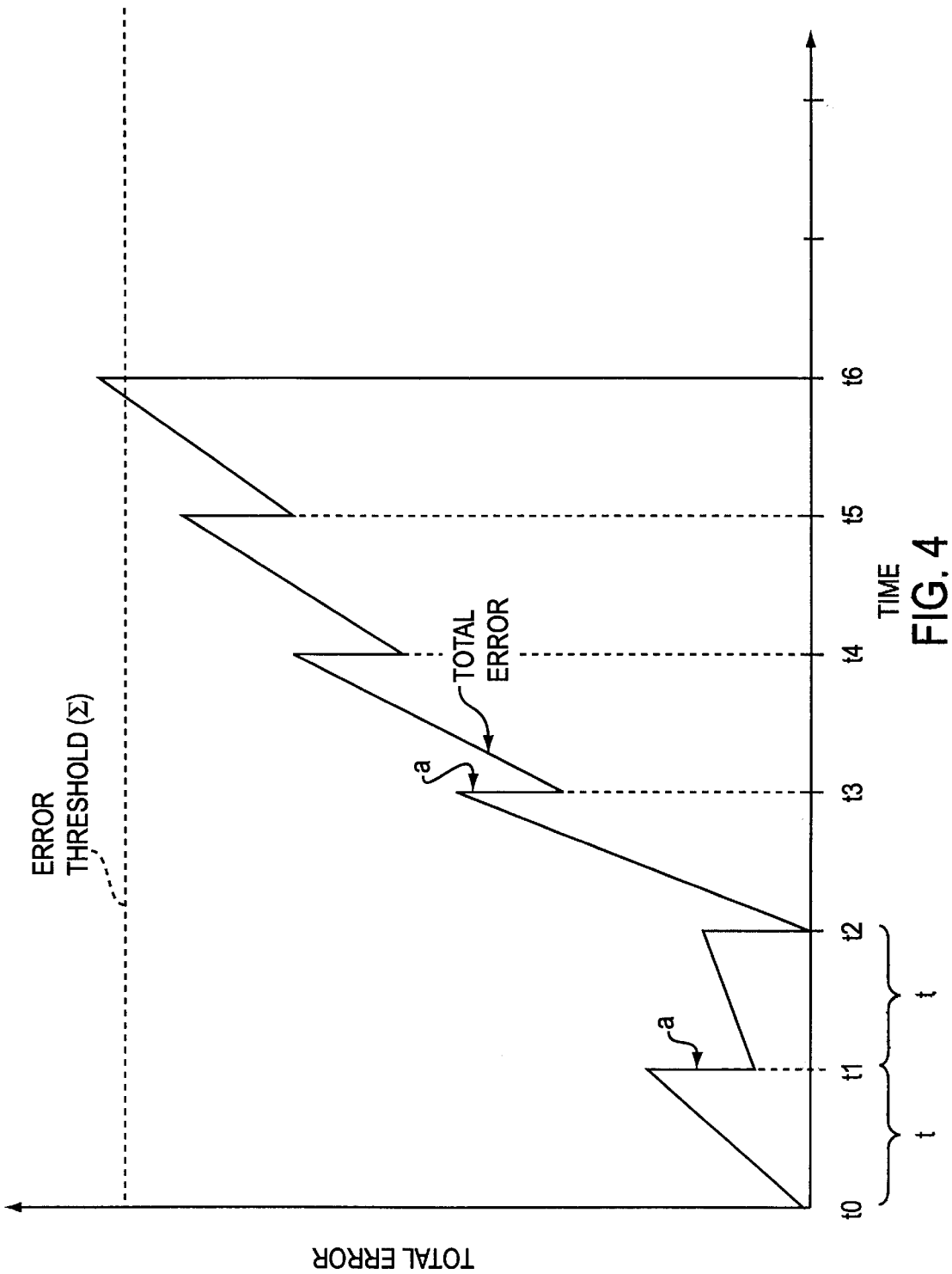

METHOD AND APPARATUS FOR MONITORING BRAKE OPERATION IN AN ANTI-LOCK OR ELECTRONIC BRAKING SYSTEM

BACKGROUND OF THE INVENTION

The present invention relates to the art of vehicle control systems, and more particularly to a method and apparatus for monitoring the operation of vehicle brakes on a vehicle equipped with an electronic braking system as is commonly used to provide traction control (TC) and/or an anti-lock braking system (ABS).

Modern vehicles commonly include traction control systems that enhance the directional stability of a vehicle and the total traction availability to the drive wheels in conditions where one or more of the drive wheels encounters a low coefficient of friction surface or otherwise develops a wheel spinning condition. Most motor vehicles incorporate a differential in which torque applied to the non-spinning wheel on one side of the vehicle is reduced when the drive wheel on the other side encounters a spinning condition. Therefore, total tractive effort is reduced.

With traction control, the speeds of the drive wheels are detected and compared with the other wheels on the vehicle. In the case of a vehicle that is also equipped with an anti-lock brake system, this comparison can be made with all of the wheels on the vehicle. To remedy a wheel spinning condition, the traction control system may reduce engine torque through a control link to the engine controller. In addition, such systems typically also activate the brake of the spinning wheel, gently pumping or modulating the brake to slow the spinning wheel speed. This brake application to the spinning wheel allows the drive differential to transmit higher torque to other drive wheels. Such traction control systems are found in passenger cars having hydraulic braking systems as well as heavy duty trucks employing pneumatic brake systems.

Since traction control systems require wheel speed inputs and active brake controllers, they are almost universally provided on vehicles also having ABS. In fact in many cases, traction control is provided as an enhancement to ABS with little or no additional hardware. Through appropriate control algorithms and software, an ABS controller can be operated to provide traction control.

Anti-lock brake systems are also generally well known. In these systems, a brake modulator valve is fluidically connected between a source of pressurized fluid (e.g., air) and the brake chamber or actuator. The modulator is typically a three-way valve that under normal service conditions receives pressurized fluid upon activation of the brakes (e.g., upon operator depression of a brake pedal) and conveys the pressurized fluid to the brake actuators. If an anti-lock event—i.e., impending wheel lock—is sensed by the associated an electronic control unit (ECU), the ECU sends electronic control signals to a solenoid valve assembly associated with the relevant modulator. The ECU controls the solenoid valve assembly in a particular manner so that the modulator valve associated with the solenoid valve assembly is caused to control the flow of pressurized fluid to the brake actuators in a manner that simulates brake pedal "pumping" at a repetition rate not obtainable by a human operator. The result is improved braking efficiency without loss of vehicle control associated with wheel lock or skid.

While anti-lock brake systems, traction control systems, and other electronic brake systems have enjoyed widespread commercial success, there has been found a need for a braking system that is also able to monitor the actual operation of the vehicle brake at the wheel end. For example, it is possible for the vehicle brake actuator or the associated brake pads or shoes or other brake components to become less effective over time due to wear or malfunction. Also, it is possible for a service technician to improperly service the brake components at a vehicle wheel end leading to decreased or inefficient application of braking force by the braking system at the affected wheel end. Prior braking systems include no means for detecting inoperable or deficient braking components at the vehicle wheel ends. With these prior systems, it is possible for a driver of such a vehicle to operate the vehicle indefinitely until the braking defect is noticed during a routine safety inspection or due to especially poor braking performance.

Accordingly, there has been deemed a need to develop a method and apparatus, fully compatible with ABS and traction control systems, that is able to monitor the operation of vehicle brake components at each wheel end and notify a vehicle operator and/or service technician upon a deficient brake assembly being detected.

SUMMARY OF THE INVENTION

In accordance with the present invention, a method and apparatus for monitoring the operation of a vehicle braking system is provided.

In accordance with a first aspect of the present invention, a method of detecting a brake system deficiency associated with a first wheel located on a first lateral side of a vehicle includes determining the rotational speed of the first wheel during at least one braking event. Substantially simultaneously, the rotational speed of a second wheel located on an opposite lateral side of the vehicle is determined during the braking event and the difference in rotational speed of the first wheel relative to the second wheel is calculated. The foregoing is repeated a plurality of times to obtain a plurality of calculated rotational speed differences between the first and second wheels, and the calculated rotational speed differences are integrated over time. The integrated rotational speed differences are compared to a select threshold, and a brake system deficiency associated with the first wheel is identified when the integrated rotational speed difference for the wheel reaches the threshold value more than a select number of times.

In accordance with another aspect of the present invention, an apparatus for monitoring the operation of left and right vehicle braking components associated with corresponding left and right side wheels of the vehicle includes left and right tone rings operatively connected to rotate with the left and right wheels, respectively, and corresponding left and right sensors operatively positioned to sense rotational frequency of the left and right tone rings. An electronic control unit is connected with the left and right sensors to receive frequency data from each sensor. The electronic control unit includes means for deriving wheel speed data for the left and right wheels during activation of the left and right braking components in a braking event, means for calculating a difference in the derived rotational speeds of each of the left and right wheels relative to the other of the left and right wheels, means for accumulating the difference in the derived rotational speeds over a duration for each of the left and right wheels, means for comparing the accumulated difference in derived rotational speeds for each of the left and right wheels with a select threshold value representing a maximum allowable accumulated difference in rotational speed for each of the left and right wheels relative to the other wheel, and means for indicating a deficiency in the brake system components associated with one of the left and right wheels when the accumulated rotational speed difference of the deficient wheel reaches the select threshold value at least once.

In accordance with still another aspect of the invention, a method of identifying the existence and location of brake system deficiencies on a vehicle having at least a left side wheel and a right side wheel and left and right side brake components respectively associated with the left and right side wheels includes determining the rotational speed of the left and right side wheels during at least one activation of the left and right side brake components. The rotational speed of the left and right side wheels are compared to each other to determine which of the left and right side wheels is being braked less efficiently relative to the other of the left and right side wheels. An indication is made to an operator of the vehicle or and a service technician of the vehicle that the brake system components associated with one of the left and right side wheels are deficient when the deficient one of said left and right side wheels is rotating at a speed greater than the other of the wheels by a select threshold amount during activation of the brake components.

In accordance with yet another aspect of the present invention, a method of calibrating left and right wheel speed sensors operatively provided respectively in association with left and right side wheels of a moving vehicle includes determining if the vehicle is moving at a velocity greater than a select minimum velocity, determining if the vehicle is turning at an angle greater than a maximum allowed turn angle, and determining if the vehicle is moving at an essentially constant speed. When the vehicle is moving at a velocity greater than the minimum velocity, turning at an angle less than the maximum allowed turn angle, and moving at an essentially constant speed, wheel rotation data from the left and right wheel speed sensors is logged. Based upon the logged wheel rotation data, a wheel speed calibration factor associated with each sensor is adjusted so that wheel speed data derived from the wheel rotation data for the left sensor using the wheel speed calibration factor associated with the left sensor is equal to wheel speed data derived from the wheel rotation data for the right sensor using the wheel speed calibration factor associated with the right sensor.

One advantage of the present invention is the provision of a method and apparatus for monitoring the operation of a vehicle braking system on a vehicle equipped with an electronic braking system as is commonly used to provide traction control (TC) and/or an anti-lock brake system (ABS).

Another advantage of the present invention is that it provides a method for identifying mechanical brake malfunction at the wheel ends of a vehicle.

A further advantage of the present invention is that it notifies a driver and/or a service technician of brake system malfunction.

Still another advantage of the invention is that it does not require the use of sensors, electronic controllers, and other components in addition to the components provided as a part of a conventional traction control/anti-lock brake system.

Yet another advantage of the present invention is found in the provision of a method and apparatus for monitoring operation of vehicle brakes that accounts for natural wheel imbalances between the wheels being monitored to prevent erroneous fault indications.

A still further advantage of the present invention resides in the provision of a method and apparatus for monitoring vehicle brake operation wherein a plurality of preconditions must be satisfied to prevent use of erroneous brake monitoring data.

Still other advantages of the invention will become apparent upon consideration of the description when taken in connection with the accompanying drawings.

BRIEF DESCRIPTION OF THE DRAWINGS

The invention may take physical form in certain parts and arrangements of parts, preferred embodiments of which are described herein and illustrated in the accompanying drawings which form a part hereof, wherein.

DETAILED DESCRIPTION OF THE PREFERRED EMBODIMENTS

While various types of motor vehicle braking systems can incorporate the features of the present invention, including hydraulic fluid and pneumatic (air) brake systems, this invention is described and illustrated in connection with an air brake system of a type typically used for heavy duty truck applications.

Figure 1:
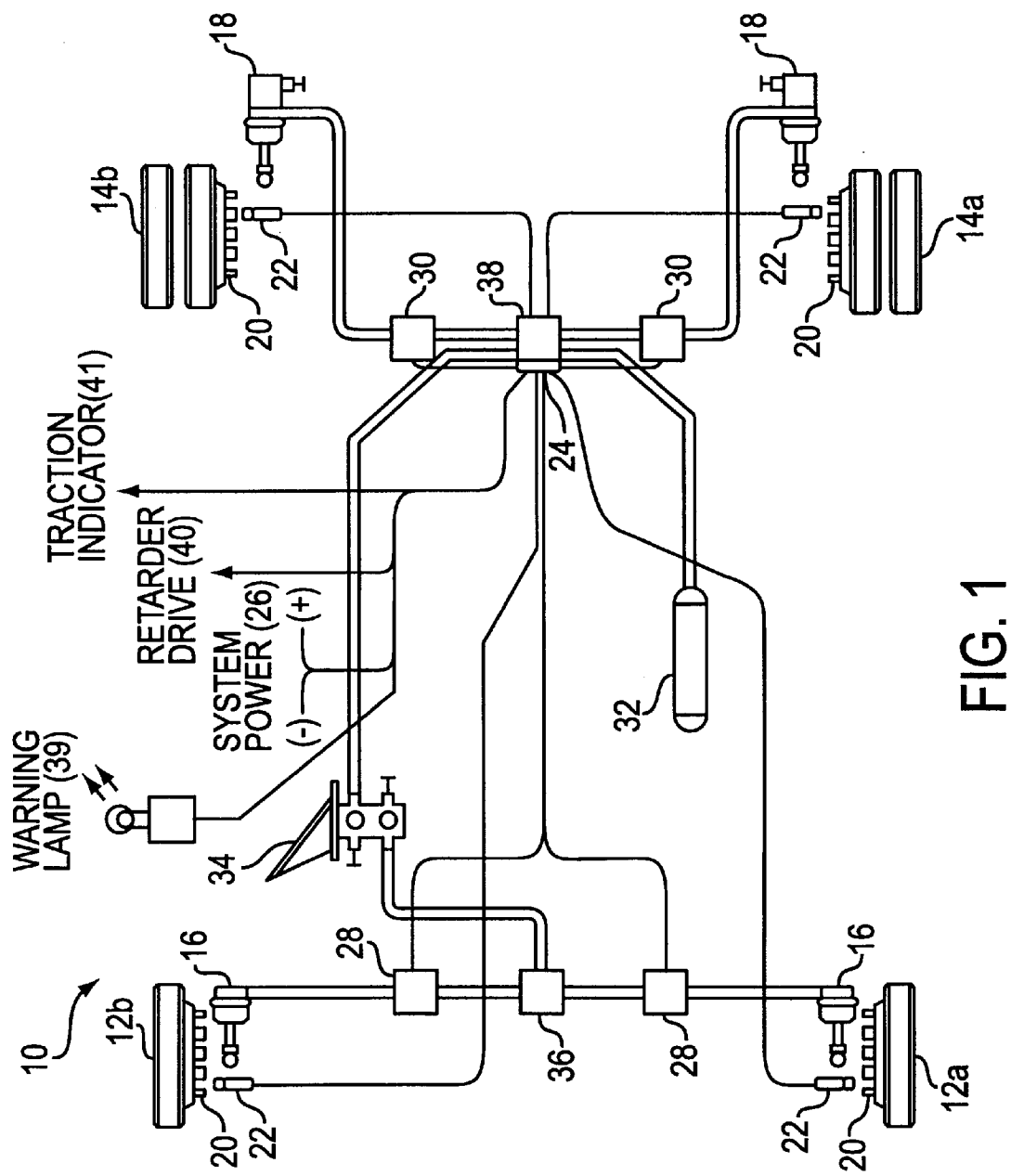
FIG. 1 is a schematic diagram of a heavy-duty truck air braking system incorporating ABS, traction control, and brake monitoring in accordance with the present invention.

Referring now to the drawings wherein the showings are for purposes of illustrating preferred embodiments of the invention only and not for purposes of limiting same, a pneumatic vehicle braking system is shown diagrammatically in FIG. 1 and is generally designated by reference number 10. The system 10 includes various components connected by solid lines to designate electrical connections and by parallel lines to designate air flow conduits. System 10 includes steerable left and right front axle wheels 12a,12b (referred to generally as wheels 12) and driven left and right rear axle wheels 14a,14b (referred to generally as wheels 14). Front axle brake actuators 16 are provided and are linked to brake shoes when drum type brakes are used, or a caliper for a disc brakes, to exert braking action on the drum or brake rotor that rotates with the associated wheels 12. Similarly, rear axle brake actuators 18 are also provided to exert braking action on drums or rotors connected to rotate with the wheels 14. Typically, the rear brake actuators 18 also incorporate an internal spring which engages the brake when air pressure is not applied to the system, thus providing a parking and emergency brake feature. In order to move the vehicle, air pressure must be applied to actuators 18 to overcome the force exerted by the internal springs and release the braking system.

ABS and traction control systems require wheel speed input signals which are provided through the use of an exciter or tone ring 20 which rotates with each of the wheels. Wheel speed sensors 22 mounted to the vehicle chassis are positioned adjacent the tone rings 20 and provide an output in the form of an AC signal which varies in voltage and frequency as the speed of the associated wheel 12,14 increases or decreases. Variable reluctance transducers are frequently employed for this application in which the flux density in the gap between tone ring 20 and wheel speed sensor 22 varies as the tone ring teeth move across a pole piece of the wheel speed sensor 22.

Braking system 10 is controlled by electronic control unit (ECU) 24, such as an EC-17 brake controller available commercially from Allied-Signal Truck Brake Systems Co., which receives wheel speed signals from each of the associated wheel speed sensors 22 and receives system power from the vehicle power supply 26. ECU 24 includes an internal computer along with interface components for controlling system 10.

Front axle brake modulators 28 and rear axle brake modulator 30 are provided adjacent the front and rear wheels 12,14, respectively, and are each connected with an associated brake actuators 16,18. The modulators 28,30 include solenoid valves (not shown) which are controlled by the ECU 24 as previously discussed so that the modulators 28,30 modify air pressure provided to the actuators 16,18 for activating or "applying" the vehicle brakes. ECU 24 is capable of simultaneously and independently controlling the four individual brake modulator assemblies 28,30.

The brake control system 10 includes an air pressure accumulator tank 32 which serves as a high pressure reservoir. A brake system control valve 34 is actuated by the vehicle operator (typically through application of foot pressure) to activate the vehicle brakes. As shown herein, the vehicle brake system 10 includes separate front and rear axle brake portions. The front brake portion includes a quick release valve 36 which receives air pressure signals for the front axle and, through front axle brake modulators 28, sends air pressure signals to front axle brake actuators 16. In a similar manner, air pressure signals are sent to rear axle brake actuators 18 through a traction system control valve 38 and modulators 30.

As further shown in FIG. 1, an ABS warning light 39 is provided and controlled by the ECU 24 to warn the vehicle operator and/or a service technician of a faulty system. The ECU 24 also includes a retarder drive output 40 and a traction control indicator light 41 to notify the vehicle operator and/or service technician that the system is operative.

The vehicle braking system 10 incorporates ABS features in which the deceleration rate of each of the road wheels 12a,12b,14a,14b is monitored during braking actions. In the event of wheel lock-up (skid) or impending wheel lock-up, appropriate control signals are directed from the ECU 24 to the subject wheel's brake modulator 28,30 to relieve braking fluid pressure in accordance with conventional ABS system operation. Likewise, the system 10 implements traction control through use of differential braking action across the driven wheels 14.

In vehicle braking systems such as that described above, there has heretofore been found no effective and convenient means for monitoring the operation of the brake actuators 16,18 and the operation of the brake shoes or pads in association with a brake drum or rotor. That is to say, even if the electronics and the pneumatics of the system 10 are operating correctly, a mechanical malfunction or wear at the wheel end can lead to deficient braking force being applied to the- affected wheel 12,14. Consequently, the present invention provides a method and apparatus for detecting malfunctions of the braking components at the wheel end.

In general, the present invention examines the speed at which each wheel 12a,12b,14a,14b rotates in relation to the wheel 12a,12b,14a,14b located at the opposite lateral side of the vehicle during certain braking events. For each wheel 12a,12b,14a,14b, the difference in wheel speeds across an "axle" (the wheels are not necessarily connected by an axle shaft but are in line with each other across the vehicle) during these select braking events is accumulated or integrated over a select duration until a threshold value is reached which indicates a malfunction at that wheel end. The accumulated difference is periodically adjusted to account for normal or acceptable levels of wheel speed variation.

In order to implement the brake monitoring method in accordance with the present invention, it is preferred that the sensors 22 associated with the left and right front wheels 12a,12b and the left and right rear wheels 14a,14b be calibrated so that wheel speed differences between the left and right wheels 12,12 or 14,14 due to natural or inherent differences (such as that occurring from tire wear, sensor variations, or like conditions) are not included in the brake operation monitoring operation which is intended to monitor wheel speed differences due only to deficient brake operation.

Figure 2A:
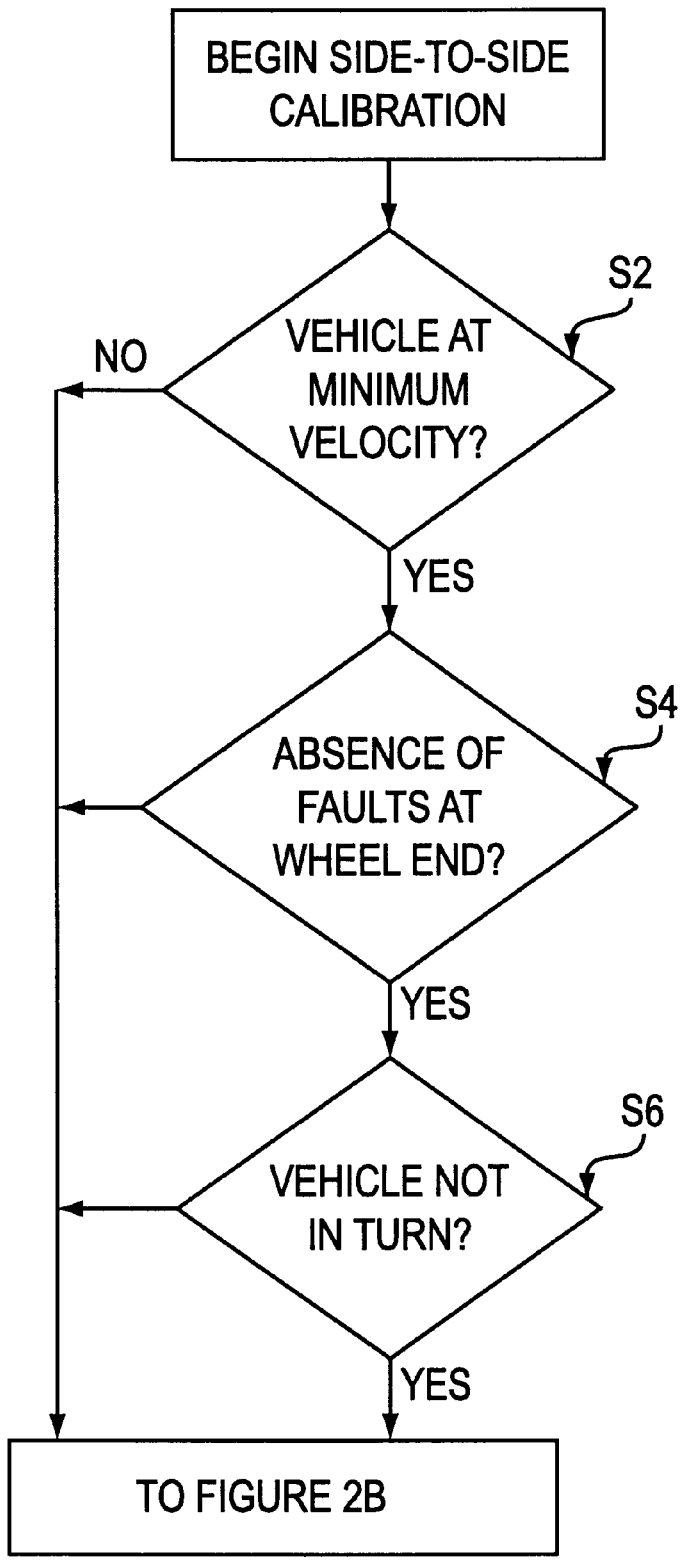
FIGS. 2A and 2B taken together are a flow chart illustrating side-to-side wheel calibration in accordance with the present invention.
Figure 2B:
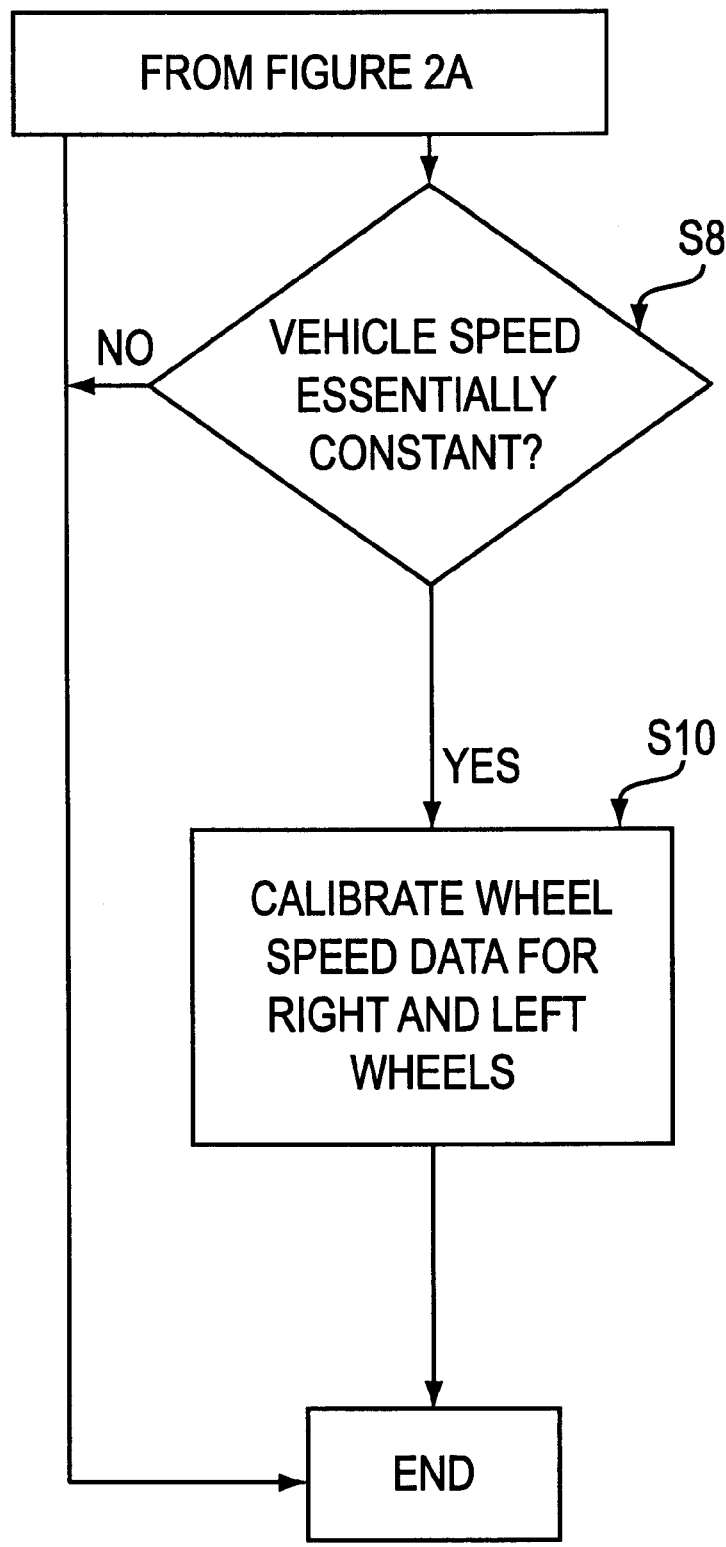

With reference now to FIGS. 2A and 2B (together referred to as FIG. 2) a side-to-side wheel speed calibration method in accordance with the present invention is illustrated. The side-to-side calibration method is preferably performed only once for each power-up of the braking system 10, as once the calibration settings for the subject left and right wheel sets 12a,12b and/or 14a,14b are obtained by and retained in the ECU 24, these calibration settings are retained until power to the ECU is cut. Furthermore, those skilled in the art will recognize that in order to monitor the brake system operation for left and right wheels 12a,12b and/or 14a,14b, the side-toside wheel speed calibration method in accordance with the present invention is preferably carried out for each of these sets of right and left wheels to be monitored. Furthermore, the brake operation monitoring method and apparatus of the present invention may be used to monitor one or more sets of left and right wheels, and the invention is not intended to be limited to use with a vehicle having the particular configuration of four wheels 12,14 as illustrated in FIG. 1.

Side-to-side wheel speed calibration in accordance with the present invention is preferably carried out by the ECU 24. The ECU initially determines if each of a variety of preconditions are met so that accurate wheel speed calibration may be performed. In particular, a step or means S2 determines whether the vehicle is traveling at the required minimum velocity, for example 5–10 miles per hour (mph), as is likely to result in more accurate wheel speed measurements.

If the vehicle is traveling at the required minimum speed, step or means S4 determines if the speed sensors 22 and associated circuitry for the subject left and right wheels 12a,12b and/or 14a,14b are functioning properly. Proper functioning of the sensors 22 and associated circuitry is indicated by an absence of fault conditions in the ECU 24.

If the sensors 22 are functioning properly, step or means S6 determines whether the vehicle is turning from a straight-line direction of travel. If the vehicle is turning, the outer wheels necessarily overrun the inner wheels, and wheel speed calibration during a turning condition would lead to use of erroneous calibration parameters. Accordingly, side-to-side wheel speed calibration cannot take place during a vehicle turn that is greater than a maximum allowable turn angle from a straight-line direction of travel. The step or means S6 preferably determines if the vehicle is turning by examining the wheel speed data obtained from all of the sensors 22. If the data indicates that either a left wheel 12a and/or 14a or a right wheels 12b and/or 14b is significantly overrunning its counterpart wheel located at the opposite lateral side of the vehicle, the step or means S6 determines a turning condition to be present. Preferably, the step or means S6 is able to recognize any vehicle turn that is greater than approximately 20°–40° as measured in a clockwise direction from the vehicle's path of travel, as such a turn angle or greater would detrimentally affect the side-to-side wheel speed calibration results. Other vehicle turn detection methods may alternatively or additionally be employed without departing from the overall scope and intent of the present invention.

For calibration of left and right wheel speed signals, it is also preferred that the vehicle speed be essentially constant. Therefore, a step or means S8 determines this by examining the vehicle speed over a select duration, e.g., 10–30 seconds. The vehicle speed over this select duration must not vary more than a select amount, e.g., 1–3 mph. If the speed varies by an amount less than the select amount, the step or means S8 determines that the vehicle is traveling at an essentially constant speed as required for calibration.

If the foregoing preconditions are not all satisfied, side-to-side wheel speed calibration in accordance with the present invention cannot be effectively carried out. However, if the preconditions are all satisfied, a step or means S10 calibrates the wheel speed data for the left and right wheels, e.g., for the left and right front wheels 12a,12b and/or the left and right rear wheels 14a,14b. The wheel speed data is calibrated using any suitable calibration technique. It is preferred that the wheel speed calibration factor for each wheel be adjusted so that the wheel speed data derived for the left and right wheels is averaged. For example, if all preconditions are satisfied and the left and right wheel speeds are derived at 20 and 22 mph using current wheel speed calibration factors in the ECU 24, respectively, the wheel speed calibration factor for each wheel is adjusted in the ECU so that both wheel speeds would now be derived at the average of these measurements, i.e., 21 mph. Thereafter, wheel speed data from left and right wheels can be compared without fear that differences in the wheel speed data is due to sensor variation, tire wear, and the like. Those skilled in the art will recognize that the wheel speed data for left and right wheels can be calibrated using any of a large number of suitable techniques, and it is not intended that the invention be limited to the particular technique described herein.

As mentioned, it is preferred that the ECU 24 repeatedly attempt to perform the side-to-side wheel speed calibration operation a regular intervals after vehicle power-up. Once the side-to-side wheel speed calibration operation is completed, a side-to-side calibration "flag" is set to indicate the same and the operation is not repeated until the next time the vehicle is started. If the steps or means S2–S8 find that any precondition is not satisfied, the side-to-side wheel speed calibration operation is not completed, and the ECU 24 begins the sideto-side calibration operation over after a select duration until the calibration operation is able to be completed.

With reference now also to FIGS. 3A–3D, brake operation monitoring in accordance with the present invention is illustrated. Preferably, the ECU 24 is programmed to monitor the operation of the vehicle braking system 10 only during a qualified brake event or application—i.e., during a braking event (application of the vehicle brakes), a plurality of preconditions must be satisfied to qualify the braking event so that actual monitoring of the brake system operation may be effectively carried out. The ECU 24 attempts the brake monitoring operation every 5 milliseconds (msec) for each wheel during each braking event. Once the monitoring operation is initiated, a step of means M2 determines if the side-to-side wheel speed calibration operation has been successfully completed. Preferably, step or means M2 examines the state of the side-to-side calibration flag which indicates whether or not the calibration operation has been completed.

If the side-to-side calibration operation has been completed, a step or means M4 preferably determines if the vehicle is traveling at the required minimum velocity, e.g., 5–10 mph, so that at least some minimum amount of braking effort is required to stop the vehicle, although the brake monitoring operation may be carried out at slower speeds.

Additionally, the braking event must be a "normal" braking event—i.e., not an anti-lock event. A step or means M6 looks for an ABS event and, for a drive axle, also looks to see if traction control is active or if the differential is locked to interconnect the left and right wheels. Any of these conditions is not a "normal" braking event and would adversely affect the wheel speed data used to monitor brake system performance.

For such a "normal" or non-ABS/non-traction control braking event, a step or means M8 directly obtains or estimates the brake application pressure, i.e., the brake fluid pressure requested by the operator of the vehicle through manual operation of the brake system control valve 34 (e.g., a brake pedal). In certain electronic braking systems, the brake application pressure is directly obtainable through a sensor or the like, and in other systems, the application pressure is estimated based upon the rate at which the vehicle is slowing during brake application.

A step or means M10 examines the brake application pressure and determines if it is greater than a minimum value. Very light brake application pressure is not likely to result in significant wheel speed differences between the left and right wheels. However, if the brake application pressure is above the minimum, e.g., 5–10 pounds per square inch (psi), wheel speed differences will be evident if either wheel is being braked with deficient brake system components.

A step or means M12 determines if the vehicle is turning during the brake application in the same manner as the step or means S6 associated with the side-to-side calibration operation. If the vehicle is turning during the braking event, the inner wheels must necessarily rotate at a slower speed than the outer wheels for successful negotiation of the turn. Therefore, any wheel speed differences between the right and left wheels during braking are not measured.

Figure 3A:
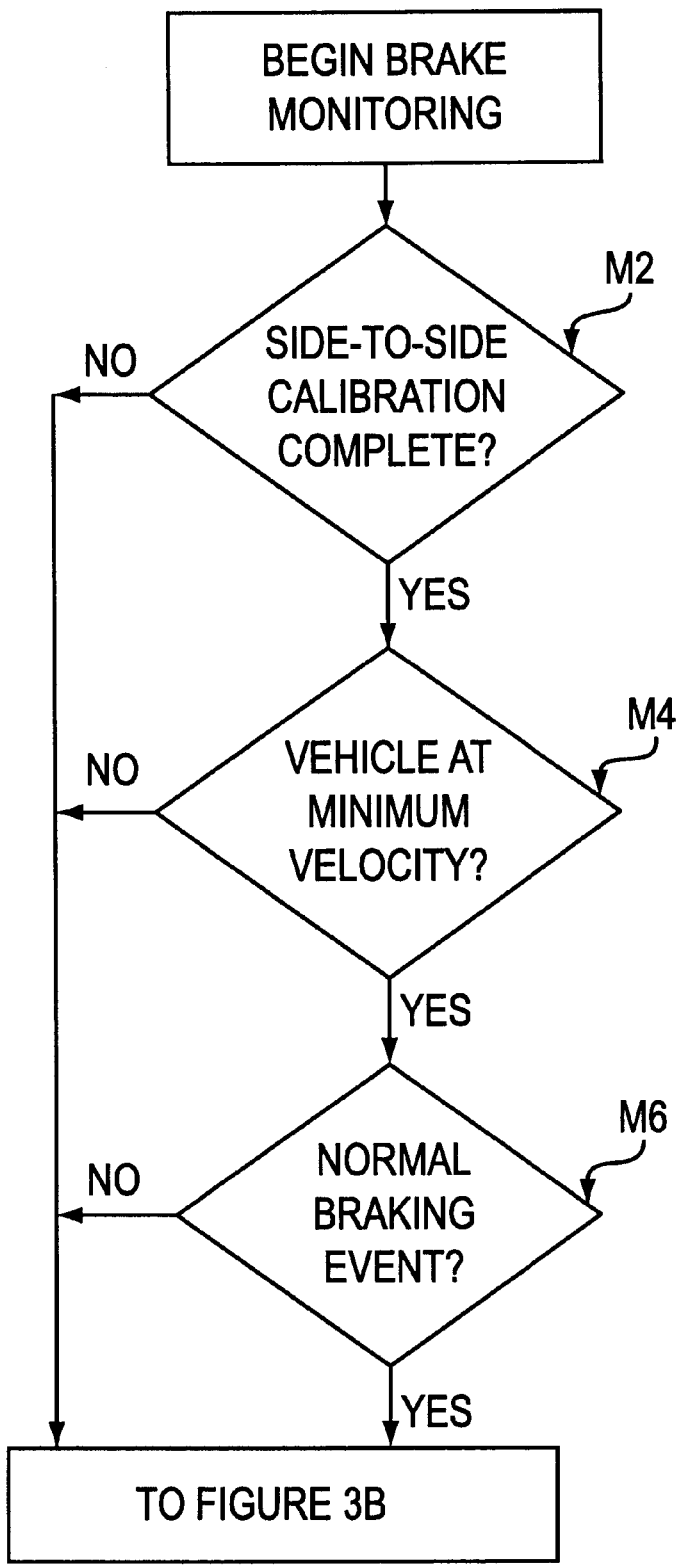
FIGS. 3A–3D taken together are a flow chart illustrating a brake monitoring method in accordance with the present invention; and, FIG. 4 is a graph illustrating brake system error integration for a particular wheel and the periodic adjustment thereof to account for natural imbalances in the system.
Figure 3B:
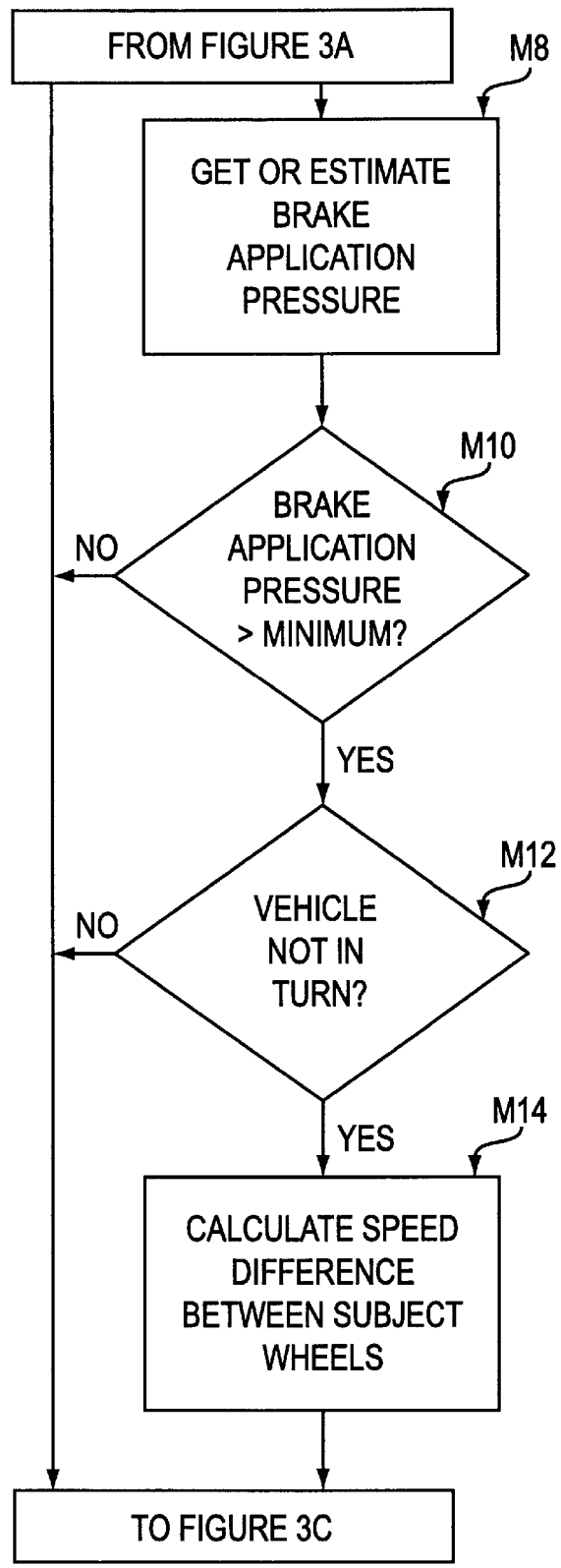
Figure 3C:
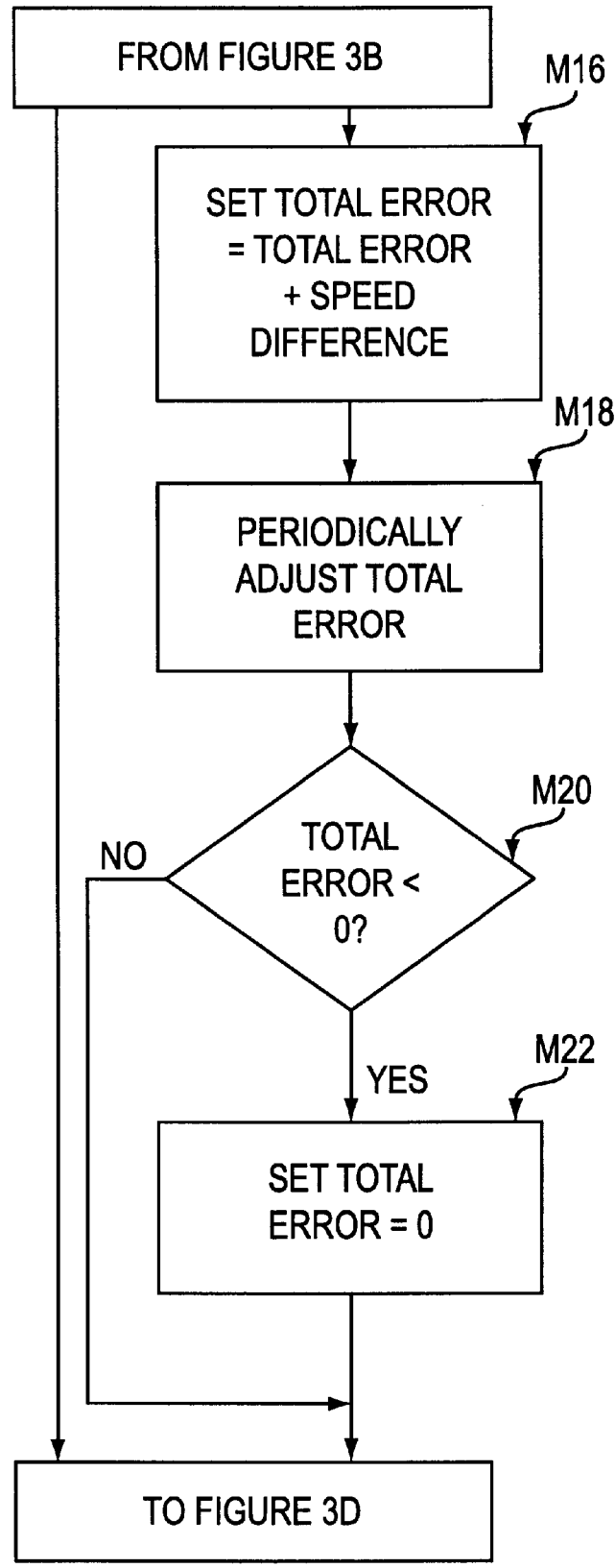
Figure 3D:
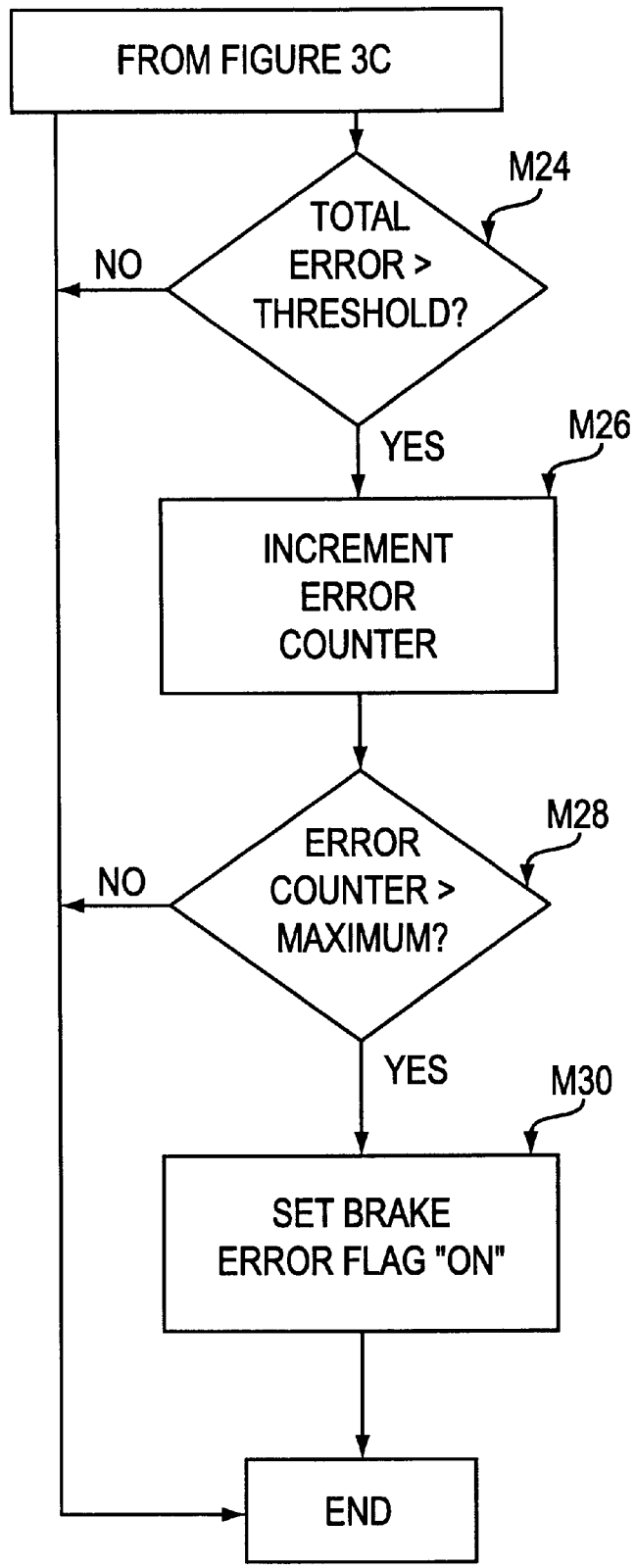

If all of the foregoing preconditions are satisfied as determined by the steps or means M2–M12 so that the braking event is qualified, then for each wheel 12a,12b,14a, 14b in turn, a step or means M14 measures the wheel speed of the subject left and right wheels of an axle and calculates the difference in wheel speeds between these associated left and right wheels (the terms "wheel speed" and "wheel speed data" are intended to encompass any speed, distance, or frequency data usable directly or indirectly to compare the rotational rate of the subject wheels). For every wheel examined, the difference in wheel speed relative to the other wheel of the axle may be positive or negative. With reference also to FIGS. 3C, 3D, and 4 for each wheel in turn, a step or means M16 collects or integrates the calculated wheel speed difference in a variable referred to herein as "TOTAL ERROR" which increases or decreases accordingly.

A step or means M18 periodically adjusts the value of TOTAL ERROR for each wheel to account for natural wheel speed differences as will occur between right and left wheels of an axle as a result of tire wear, road conditions, vehicle turning not detected by the step or means S6,M12, and other such natural imbalances. The value of TOTAL ERROR is preferably preserved even after the vehicle braking system is powered down so that brake deficiencies are able to be detected over an extended period of time rather than over a single use of the vehicle.

For example, with particular reference again to FIGS. 3C, 3D, and 4 it is shown that the TOTAL ERROR for the illustrated wheel as integrated by the step or means M16 increases over time as a result of the braking components associated with the illustrated wheel of a pair of left and right side wheels being weaker or somewhat deficient relative to the braking components associated with the correspondingly located wheel on the other side of the vehicle. After every time interval t, e.g., 250 msec, the TOTAL ERROR is adjusted downward by the step or means M18 in an amount "a" to account for natural wheel speed differences between corresponding left and right vehicle wheels as mentioned above.

A review of FIG. 4 indicates that over the time interval t0–t2, TOTAL ERROR does not climb rapidly, and the periodic adjustment a is sufficient to prevent the TOTAL ERROR from increasing toward the error threshold E. The error threshold E is a select value of TOTAL ERROR for each wheel indicative of an excessive cumulative difference in wheel speeds for that wheel and the wheel at the opposite lateral side of a vehicle as indicates a deficient brake system component associated with the wheel being monitored. After each adjustment, a step or means M20 (FIG. 3C) examines the value of TOTAL ERROR for each wheel to determine if it is less than 0 following the adjustment by step or means M18. If TOTAL ERROR<0, a step or means M22 (FIG. 3C) sets TOTAL ERROR=0.

A step or means M24 determines if the value of TOTAL ERROR for any wheel exceeds the error threshold E, and if so, a step or means M26 (FIG. 3C) increments an error counter. This is illustrated in FIG. 4 wherein, after time t2, it is apparent that the wheel being monitored is not slowing as fast as the other wheel during one or more qualified braking events. Accordingly, the value of TOTAL ERROR for the wheel climbs rapidly, and the periodic adjustment a is not sufficient to prevent the value of TOTAL ERROR from reaching the error threshold E at time t6. Accordingly, upon the value of TOTAL ERROR reaching the error threshold at time t6, the error counter for the particular wheel shown is incremented by step or means M26, and the value of TOTAL ERROR for the wheel is reset to 0.

A step or means M28 determines if the error counter for any wheel is greater than a select maximum value as would indicate that the value or TOTAL ERROR has exceeded the error threshold E more than a select number of times. If the error threshold E is repeatedly exceeded by the value of TOTAL ERROR, this indicates a likelihood of a deficient brake system at the subject left or right wheel of the axle. In such case, a step or means M30 sets a brake error flag for that wheel "on" and the ECU 24 outputs a signal by means of an indicator light, fault code, or the like to the vehicle operator and/or service technician that deficient brake component operation has been detected at the particular wheel end.

The invention has been described with reference to preferred embodiments. Obviously, modifications and alterations will occur to others upon reading and understanding the preceding specification. It is intended that the invention be construed as including all such modifications and alterations insofar as they fall within the scope of the following claims.

Having thus described the preferred embodiments, what is claimed is:

1. A method of detecting a brake system deficiency associated with a first wheel located on a first lateral side of a vehicle, said method comprising:
   a) determining the rotational speed of the first wheel during at least one braking event;
   b) substantially simultaneously with step a) determining the rotational speed of a second wheel located on an opposite lateral side of the vehicle during the at least one braking event;
   c) calculating the difference in rotational speed of the first wheel relative to the second wheel based upon the rotational speed of each wheel as determined is during the at least one braking event;
   d) repeating steps a)–c) a plurality of times to obtain a plurality of calculated rotational speed differences between the first and second wheels
   e) accumulating the plurality of calculated rotational speed differences over a duration;
   f) comparing the accumulated rotational speed differences to a select threshold value; and,
   g) identifying a brake system deficiency associated with the first wheel when the recorded rotational speed difference reaches the threshold value more than a select number of times.

2. The method as set forth in claim 1 wherein steps a)–c) are repeated a plurality of times during the at least one braking event.

3. The method as set forth in claim 2 wherein steps a)–f) are repeated during a plurality of vehicle braking events.

4. The method as set forth in claim 1 wherein said at least one vehicle braking event is a qualified braking event, said method further comprising, before step a):
   determining if a vehicle braking event is a qualified braking event if at least a plurality of the following conditions are satisfied:
      i) the vehicle is traveling greater than a select minimum velocity;
      ii) the braking event is not an anti-lock braking event;
      iii) a traction control system of the vehicle is not controlling the braking event;
      iv) the first and second wheels are not connected to rotate in unison through a differential;
      v) brake actuation pressure is greater than a select minimum pressure; and,
      vi) the vehicle is turning at an angle from a straight line of travel which is less than a select maximum allowed turn angle.

5. The method as set forth in claim 1 wherein step e) includes:
   i) integrating the plurality of calculated rotational speed differences to obtain a total value; and,
   ii) periodically adjusting the total value by a select amount to account for natural rotational speed differences between said first and second wheels during the at least one braking event.

6. The method as set forth in claim 1 wherein the first and second wheels are located in line with each other at corresponding axial locations between front and rear ends of the vehicle.

7. An apparatus for monitoring the operation of left and right vehicle braking components associated respectively with corresponding left and right side wheels of the vehicle, said apparatus comprising:

left and right tone rings operatively connected to rotate with said left and right wheels, respectively;

left and right sensors operatively positioned to sense rotational frequency of the left and right tone rings, respectively; and, a electronic control unit connected with the left and right sensors to receive frequency data from each sensor, said electronic control unit comprising:

means for deriving wheel speed data for the left and right wheels during activation of the left and right braking components in at least one braking event;

means for calculating a difference in the derived rotational speeds of each of the left and right wheels relative to the other of the wheels;

means for accumulating the difference in the derived rotational speeds over a duration for each of the left and right wheels relative to the other of the wheels;

means for comparing the accumulated difference in derived rotational speeds for each of the left and right wheels with a select threshold value representing a maximum allowable accumulated difference in rotational speed for each of the left and right wheels relative to the other of the left and right wheels; and, means for indicating a deficiency in the brake system components associated with one of the left and right wheels when the accumulated rotational speed difference of said one wheel reaches said select threshold value at least one time.

8. The apparatus as set forth in claim 7 wherein said electronic control system further comprises:

means for calibrating the left and right sensors with each other so that said electronic control unit derives substantially equal wheel speed data for the left and right wheels when the left and right wheels are rotating at substantially the same speed.

9. The apparatus as set forth in claim 7 wherein said electronic control unit further comprises:

means for determining whether activation of the left and right vehicle braking components is a qualified braking event including:

means for detecting if at least one of an anti-lock braking or a traction control system of the vehicle is active; and, means for determining if the vehicle is turning at an angle from a straight-line direction of travel that is greater than a select turn angle, wherein said qualified braking event determining means determines a braking event to be a qualified braking event if the vehicle ABS and traction control systems are not active and the vehicle is not turning at an angle from a straight-line direction of travel that is greater than a select turn angle.

10. The apparatus as set forth in claim 7 wherein the means for accumulating the difference in rotational speed between the left and right wheels includes:

means for integrating a total difference value from the calculated individual differences in rotational speeds between each of the left and right wheels relative to the other of the left and right wheels over a duration; and, means for periodically offsetting the total difference value for each of the left and right wheels to account for acceptable wheel speed differences of the left and rights wheels relative to each other.

11. A method of identifying the existence and location of brake system deficiencies on a vehicle having at least a left side wheel and a right side wheel and left and right side brake components respectively associated with the left and right side wheels, said method comprising:

a) during at least one activation of the left and right side brake components, determining the rotational speed of the left and right side wheels;

b) comparing the determined rotational speeds of the left and right side wheels to each other to determine which one of said left and right side wheels is being braked less efficiently relative to the other of the left and right side wheels;

c) indicating to at least one of an operator of the vehicle and a service technician of the vehicle that said brake system components associated with said one of said left and right side wheels are deficient when said one of said left and right side wheels is rotating at a speed greater than the other of said left and right side wheels by a select threshold amount during said at least one activation of said left and right brake components.

12. The method as set forth in claim 11 wherein step a) is carried out when:

i) the vehicle is traveling at a select minimum velocity;

ii) the left and right wheels are not connected to rotate together by a locked differential;

iii) the activation of the left and right brake system components is not being controlled by an anti-lock braking system or traction control system; and, iv) the vehicle is traveling in a substantially straight line path.

13. The method as set forth in claim 11 wherein, step a) includes:

determining the rotational speed of the left and right side wheels a plurality of times during the at least one activation of the left and right side brake components; step b) includes:

b-1) comparing the rotational speed of the left and right side wheels for each time the rotational speeds of the wheels is determined; and, b-2) for each of the left and right side wheels, recording a total difference in rotational speed relative to the other of said left and right wheels based upon each comparison over a duration; and, step c) includes the preliminary step of:

for each of the left and right side wheels, comparing the total difference recorded over the duration to a select threshold value indicative of a deficient brake system component associated with said wheel.

14. The method as set forth in claim 13 wherein step b further comprises:

b-3) periodically reducing the recorded total difference in rotational speed for each of the left and right side wheels to account for an acceptable amount wheel speed variation between the left and right side wheels during the at least one activation of the left and right brake system components.

15. A method of calibrating left and right wheel speed sensors operatively provided respectively in association with left and right side wheels of a moving vehicle, said method comprising:

determining if said vehicle is moving at a velocity greater than a select minimum velocity;

determining if the vehicle is turning at an angle greater than a maximum allowed turn angle;

determining if the vehicle is moving at an essentially constant speed; and, when said vehicle is moving at a velocity greater than the minimum velocity, turning at an angle less than the maximum allowed turn angle, and moving at an essentially constant speed, logging wheel rotation data from said left and right wheel speed sensors and adjusting a wheel speed calibration factor associated with each sensor so that wheel speed data derived from said wheel rotation data for said left wheel speed sensor using said wheel speed calibration factor associated with said left sensor is equal to wheel speed data derived from said wheel rotation data for said right wheel speed sensor using said wheel speed calibration factor associated with said right sensor for a given speed of the moving vehicle.

* * * * *